United States Patent
Ido et al.

(10) Patent No.: US 6,596,069 B2
(45) Date of Patent: Jul. 22, 2003

(54) GLITTERING PIGMENT AND GLITTERING COATED FILM

(75) Inventors: Takayasu Ido, Aichi-ken (JP); Hiroshi Watarai, Aichi-ken (JP); Yasuhiko Ogisu, Aichi-ken (JP); Kenjiro Arai, Omiya (JP); Kunio Kobiyama, Omiya (JP); Tsuyoshi Bekki, Omiya (JP)

(73) Assignees: Toyoda Gosei Co., Ltd., Aichi-ken (JP); Cashew Co., Ltd., Osaka (JP)

( * ) Notice: Subject to any disclaimer, the term of this patent is extended or adjusted under 35 U.S.C. 154(b) by 0 days.

(21) Appl. No.: 09/792,068

(22) Filed: Feb. 26, 2001

(65) Prior Publication Data

US 2002/0013398 A1 Jan. 31, 2002

(30) Foreign Application Priority Data

Mar. 24, 2000 (JP) ........................................ 2000-084944

(51) Int. Cl.⁷ .............................. C09C 1/62; C08L 1/10; C08L 1/18; B32B 23/14; B32B 27/20
(52) U.S. Cl. ...................... 106/403; 106/415; 523/200; 524/31; 524/35; 524/401; 428/407; 428/532
(58) Field of Search ............................ 524/35, 31, 401; 106/403, 415; 427/220, 222; 428/407, 532; 523/200

(56) References Cited

U.S. PATENT DOCUMENTS

| | | | | |
|---|---|---|---|---|
| 4,171,977 A | * | 10/1979 | Hasegawa et al. | |
| 5,849,817 A | * | 12/1998 | Green et al. | 523/515 |
| 6,045,646 A | * | 4/2000 | Yoshikawa et al. | |
| 6,214,467 B1 | * | 4/2001 | Edwards et al. | 428/407 |
| 6,335,057 B1 | * | 1/2002 | Noura et al. | 427/380 |
| 6,352,687 B1 | * | 3/2002 | Ismailer et al. | 424/61 |
| 6,369,147 B1 | * | 4/2002 | Polonka et al. | 524/413 |

FOREIGN PATENT DOCUMENTS

| | | |
|---|---|---|
| JP | 11-080620 | 3/1999 |
| JP | 11-116861 | 4/1999 |

OTHER PUBLICATIONS

Cellulose Acetate Butyrate, Eastman Laboratory Chemicals Catalog No. 55 93–94 Edition.*

* cited by examiner

*Primary Examiner*—Tae H. Yoon
(74) *Attorney, Agent, or Firm*—Posz & Bethards, PLC

(57) ABSTRACT

A glittering paint, not requiring formation of primer layer and/or clear top coat layer includes a coated film forming polymer, a glittering pigment comprising inorganic powder and a solvent, wherein the coated film forming polymer comprising a pigment carrying polymer, wherein the pigment carrying polymer has a weight average molecular weight (Mw) of at least 50,000 and a refractive index $n_D$ of at least 1.48 as measured by an Abbe refractometer, the coated film forming polymer has an entire weight average molecular weight (Mw) of at least 50,000, the inorganic powder has an aspect ration of particle length or diameter to particle thickness of at least 50, and the glittering pigment content (PWC) in the coated film is 15 wt % or less.

19 Claims, 1 Drawing Sheet

GLITTERING PIGMENT AND GLITTERING COATED FILM

CROSS-REFERENCE TO RELATED APPLICATION

This application claims priority from Japanese patent application No. 2000-84944, filed on Mar. 24, 2000, the complete disclosure of which is hereby incorporated herein by reference.

BACKGROUND OF THE INVENTION

1. Field of the Invention

This invention is related to a glittering paint and a glittering coated film. The glittering paint for obtaining a glittering coated film according to the present invention comprises a coated film forming polymer, a glittering pigment and a solvent. Use of the glittering pigment results in a glittering surface, for example, of metallic tone.

The glittering paint according to this invention is suitable for formation of a glittering coated film on plastic exterior articles of an automobile such as front grills, usually based on ABS resin material, and wheel caps, usually made of PP (polypropylene) substrate, requiring high glitter appearance.

The present invention discloses an exemplary method for forming a glittering surface of metallic tone as the glittering surface, however the present invention is applicable also for the formation of other aesthetic glittering surfaces, such as, for example, of ceramic tone (tone of pottery or china).

The abbreviations used in the present specification are as follows. "NV" is an abbreviation for "non volatile" and NV % means a non-volatile content (paint solid content) concentration. "PWC" is an abbreviation for "pigment weight concentration", denoting the content of the pigment in the coated film(coated film ingredient). "Mw" is an abbreviation for the "weight average molecular weight", converted as polystyrene.

2. Description of Related Art

It is well known that glittering surfaces of metallic tone can be obtained conventionally by either applying metal foils or depositing metal membranes by vapor deposition to substrates or the like. However, it is difficult to uniformly apply the metal foils on substrates of a complicated shape having uneven surfaces, because of the locally occurring creasing problem. Furthermore, a special vacuum apparatus is required for the vapor deposition in the method of depositing metal membranes, which makes it difficult to apply the method to large size substrates.

In view of the above shortcomings, a method for forming a glittering coated film having a glittering surface of metallic tone, with a structure as shown in FIG. 1., has been proposed in Japanese Laid-Open Patent No. 80620/1999.

A base coated film (primary layer), 14 is formed on a substrate (plastic molding product), 12, a metallic paint is coated on the base coated film, 14 to form a metallic tone layer (glittering layer) 16, and then a top coat layer (clear coated film) 18 is formed.

Preferred metallic paints disclosed in the Japanese Patent are those containing metal flakes (metal powder with high aspect ratio) which are prepared by pulverizing vapor deposited metal films of glittering pigment, 20. In order to achieve glittering appearance of the base coated film, 14, it is necessary to orient the glittering pigment, 20 in a planar arrangement. Therefore, it is desirable that the glittering layer (metal tone layer), 16 be as thin as possible (2 μm or less).

In order to achieve the desired looks of high glitter, it is necessary to form the thin metallic tone layer 16 by applying a metallic paint of high PWC (15% or more) onto the baked base coated film 14, followed by formation of the top coat layer (clear coated film) for protection. All of the metallic paints used in the illustrative examples of the Japanese Patent have PWC: 100%, except for Preparation Examples 4, 5 as shown in Table 1. The results show in Table 2, examples 4, 5, 10 and 11 demonstrate that in the Preparation Examples 4, 5 with PWC of 20% and 10%, sufficient gloss (glittering property) cannot be easily obtained if the baking temperature of the base layer is low.

Therefore, in the method of forming the glittering coated film as described in the Japanese Laid-Open Patent No. 80620/1999, it is necessary not only to use a relatively high amount of pulverization product of vapor deposited films as the glittering pigment, but also to use a primer layer to level the surface of the substrate, and to sufficiently heat the primer layer to cure the primer layer.

SUMMARY OF THE INVENTION

The object of this invention is to provide a glittering paint and a glittering coated film which does not necessarily require formation of a primer layer and/or clear top coat layer.

Another object of this invention is to provide a glittering paint capable of producing a glittering coated film of metallic tone, without using a great amount of pulverization products of vapor deposition films.

A glittering paint for producing or obtaining a glittering coated film according to the present invention comprises:

a coated film forming polymer, a glittering pigment comprising an inorganic powder and a solvent, wherein the coated film forming polymer comprises a pigment carrying polymer, wherein the pigment carrying polymer has a weight average molecular weight (Mw) of at least 50,000 and a refractive index (by Abbe's refractometer) ($n_D$) of at least 1.48, the coated film forming polymer has an overall weight average molecular weight (Mw) of at least 50,000, the inorganic powder has an aspect ratio (the ratio of the length or diameter of a particle to the thickness of the particle) of at least 50 and, the glittering pigment weight concentration (PWC) in the coated film is 15% or less.

In the glittering paint described above, excellent appearance of glittering can be easily obtained by using glittering pigment comprising a inorganic powder having an aspect ratio of 250 to 500 (mainly metal powder).

The metal powder with the aspect ratio within the range described above can be obtained easily by pulverizing vapor deposition films of aluminum or the like.

The pigment carrying polymer may be selected from one or more of cellulose polymers or one or more of polar group containing vinyl polymers, preferably, one or more of polar group introduced polyolefins.

A glittering coated film comprising at least one layer and having a glittering surface according to the present invention can be formed by applying the glittering paint as described above to a substrate and forming a glittering layer to a thickness of 5 to 20 μm on the substrate.

Performance of the coated article can be significantly improved when a clear coat film layer is applied on the glittering layer forming coated glittering film.

DETAILED DESCRIPTION OF THE PREFERRED EMBODIMENTS

Each of the embodiments described above will be now explained in greater detail wherein the blending parts and percentages all given by weight unless otherwise specified.

According to this invention, the glittering paint, which is used for obtaining a coated film having a glittering surface, comprises a polymer as a coated film base, a glittering ingredient which comprises an inorganic powder, and a solvent.

In the glittering paint, polymer is formed entirely or partially with a pigment carrying polymer. The pigment carrying polymer may be either thermoplastic or thermosetting resin, so long as it has the molecular weight and a refractive index as described below.

When a metal powder is used as the inorganic powder for the glittering pigment, the resin is a cellulose polymer, or one or more of polar group-containing vinyl polymers.

Suitable cellulose polymers include cellulose esters and cellulose ethers. Cellulose esters such as cellulose nitrate (NC), acetyl cellulose (CA), acetyl butyl cellulose (CAB) and acetyl propyl cellulose (CAP) can be used for the invention. Among them, cellulose nitrate is preferred because it can easily provide a refractive index ($n_D$) of 1.48 or more.

The polar group-containing vinyl polymers include any polar group containing vinyl polymers, i.e. polymers obtained by addition polymerization of not only vinyl compounds but also of vinylidene compounds and vinylene compounds.

Most suitable polar group-containing vinyl polymers include polar group-introduced polyolefins and polar group-containing vinyl compound polymers/derivatives.

Polar group-introduced polyolefins are formed by chlorination, maleic acid modification or hydroxyl group modification of polyolefins such as polypropylene (PP), polyethylene (PE) and polybutene (PB).

Polar group-containing vinyl compound polymers/derivatives are obtained by polymerizing one or more of polar group-containing compounds.

In polar group-introduced polyolefin, chlorinated PP, hydroxyl group modified PP, maleic acid modified PP, hydroxy group modified PE, maleic acid modified PE, as well as mixture thereof are preferred.

In polar group-containing vinyl compound polymers/derivatives, vinyl chloride, vinyl acetate copolymer or polyvinyl butyral are preferred.

Among them, the polar group introduced polyolefins are preferred since they can form an intimate contact with the substrate without primer even when the substrate is made of polyolefin such as PP.

The pigment carrying polymer has a molecular weight (Mw) of at least 50,000, preferably at least 100,000, more preferably, at least 200,000 and a refractive index ($n_D$) of at least 1.48, preferably at least 1.50.

If the molecular weight (Mw) and/or the refractive index ($n_D$) are lower than 50,000 and 1.48, respectively, a coated film with glittering is difficult to obtain.

It is essential for the pigment carrying polymer to have substantially high molecular weight (Mw) for the reason presented below.

Figure 2:
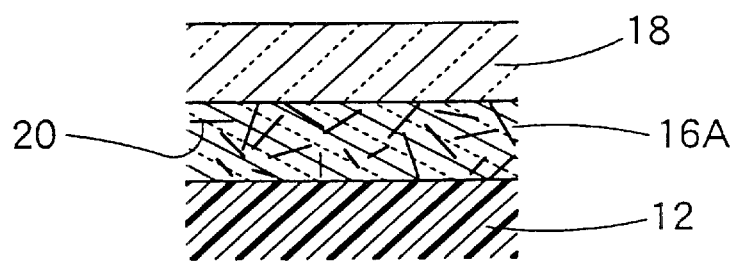
FIG. 2 shows a cross sectional view of a glittering layer obtained with a glittering paint containing a polymer ingredient of low molecular weight.

In the coated film layer, just after the coating, the evaporating solvent creates a convention flow. Due to the convection flow, the glittering pigment, usually comprising inorganic powder with an aspect ratio of 50 or more, does not get arranged parallel to the substrate in the paint. As shown in FIG. 2, the orientation of the glittering pigment (inorganic powder) 20 in the glittering layer is random. Accordingly, when a usual glittering paint, containing a glittering pigment and a pigment carrying polymer of Mw less than 50,000, is coated on the substrate 12 to form the glittering layer 16A, followed by application of the clear top coat layer 18, sufficient glittering cannot be obtained regardless of whether the paint contains additional polymeric components or not.

Figure 1:
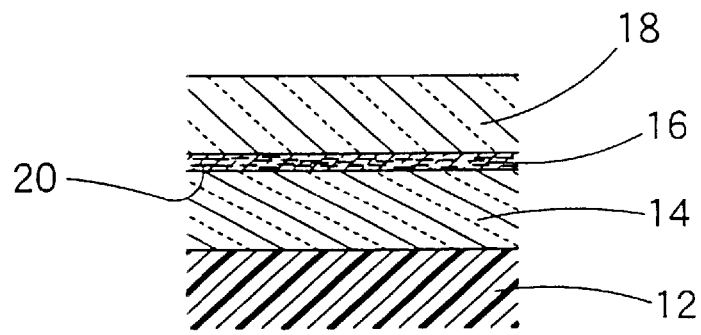
FIG. 1 illustrates a multi-layered glittering coated film according to the a prior art.

In the prior art, the glittering property is provided by using a system comprising an evaporating solvent, which controls the convection flow in the coated film layer. The metal powder (glittering pigment) 20 gets oriented horizontally while the film thickness is reduced by a coating method, with less discharging amount as shown in FIG. 1.

Figure 3:
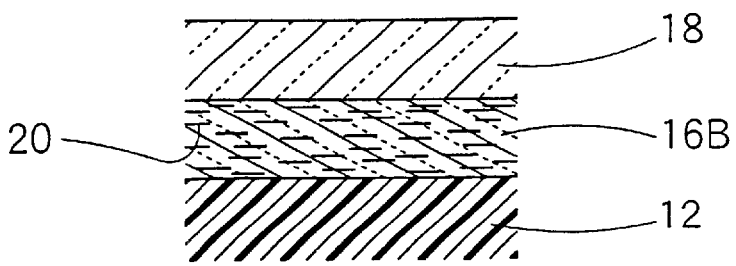
FIG. 3 shows a cross sectional view of a coated film obtained with a glittering paint according to the present invention.

In contrast, in the present invention, the degree of orientation of the glittering pigment (inorganic powder) is improved, as shown in FIG. 3, by controlling the convection flow, in the coated film layer (glittering layer 16B) by using a resin polymer of a high molecular weight (50,000 or more) as the coated film forming element of the glittering paint.

Furthermore, it is essential for the present invention that the refractive index ($n_D$) of the pigment carrying polymer is at or above 1.48 for the reasons described below.

When the refractive index is high, the light permeating the glittering layer (coated film layer) arrives at and is reflected on the inorganic powder as the glittering pigment in a relative short distance, so that the amount of the reflection light increases relatively, that is, the appearance of glittering increases.

The glittering paint according to the present invention may further comprise a second polymeric component or second polymer. The second polymer can be either thermoplastic or thermosetting (one component or two component type) so long as it is a polymer resin compatible or miscible with the first polymer. Usually, when a glittering layer is formed directly on a substrate, without using a primer, the second polymer is selected from one or more of polymers having favorable adhesion with a substrate (usually, plastic molding product). The mixing ratio between the first polymer and the second polymer is 4:6 or more, preferably, 5:5 or more by weight of the polymers.

Specifically, thermosetting resins (two component or one component type) such as acryl urethane resin, acryl resin, urethane resin, alkyd resin and unsaturated polyester (maleic acid resin) and epoxy resin are suitable. These resins are preferred because they can be coated at a low viscosity, provide excellent coatability and give favorable heat resistance of the coated film and adhesions to plastics. Among them, acryl urethane resins, excellent in transparency and adhesion to plastics are particularly preferred.

Thermoplastic resins such as vinyl chloride resin and polyamides can also be used.

It is necessary that the average molecular weight (Mw) of the second polymer is such that upon mixing it with the first or pigment carrying polymer, the overall average molecular weight (Mw) of the polymer component (the first and the second polymer), prior to being cured, in case of either one or both the first and the second polymer being thermosetting, is at least 50,000, preferably, at least 80,000 and, more preferably, at least 120,000. If the overall molecular weight of the polymer component or ingredient, Mw, is less than 50,000, it is difficult to obtain a coated film with glittering appearance.

Accordingly, when the first polymer has a molecular weight (Mw) of much more than 50,000, the molecular weight (Mw) of the second polymer may be less than 50,000. Moreover, in order to improve the coatability by lowering the solubility in the solvent and lowering the paint viscosity, it is preferred to use the second polymer with a molecular weight (Mw) of less than 50,000.

The suitable solvent is selected depending upon the resin selected. One or more of solvents can be mixed and selected based upon the kinds of the solvent contained in the base coat, top coat paint, or in a metal powder paste as the glittering pigment supply source, and the substrate (article to be coated). Further considerations in the selection of the solvents are the coating method (spraying, brushing, dipping or the like) and the structure of coated film (single layer or plural layer and film thickness or the like). Specifically, one or more of the solvents exemplified below can be mixed and used suitably, but other solvents such as halogenated hydrocarbons, ethers, aldehydes, nitrogen-containing compounds and other paint thinners may also be used alone or as a mixture.

Suitable solvents include hydrocarbons such as toluene, xylene and n-hexane; acetates, such as methyl acetate, ethyl acetate, iso-propyl acetate, n-propyl acetate, n-butyl acetate and iso-butyl acetate; mono-hydric alcohols, such as, methanol ethanol, n-propanol, iso-propanol, n-butanol, iso-butanol and s-butanol, ketones such as acetone, methyl ethyl ketone and methyl isobutyl ketone, glycol derivatives, such as propylene glycol monoethyl ether, propylene glycol monoethyl ether acetate, ethylene glycol monomethyl ether, ethylene glycol monoethyl ether acetate and ethylene glycol monoethyl ether acetate.

Suitable substrates include resin molding products which are preferably selected from polyolefinic molding products, having relatively reduced weight, high heat resistance and impact resistance such as polypropylene, especially in a case of molding products for automobiles. The substrates may include molding products based on polar thermoplastic resins such as resins comprising AS resin, ABS resin, methacrylic resin (PMMA) and saturated polyester resin as well as thermosetting resin, such as those comprising unsaturated polyester, urea resin and melamine resin.

The inorganic powder having an aspect ratio of 50 or more, preferably, 250 to 300 can be suitably used as the glittering pigment for the paints according to the present invention. If the aspect ratio is less than 50, it is difficult to obtain powder orientation capable of providing the glittering appearance in the coated film. Higher aspect ratio can provide higher powder orientation which tends to provide the glittering appearance more easily. When inorganic powder with high aspect ratio (glittering pigment) is oriented parallel to the substrate, high glittering is achieved. The inorganic powder (metal powder) of high aspect ratio can be provided by vapor deposition film pulverization products to be described later.

When it is desired to obtain a glittering surface of a metallic tone, metal powder formed by pulverizing metal foils or metal vapor deposition films such as aluminum (Al), gold, silver, copper, brass, titanium, chromium, nickel-chromium, and stainless steel, is used as the inorganic powder. Further, if it is desired to obtain a glittering surface of other than the metallic tone, inorganic powder such as titanium oxide (IV), chromium oxide (III), zinc oxide and iron oxide (III), nickel-titanium yellow and mica powder can also be used. The coloring pigmenting other than those described above, may also be used suitably.

Usually, in a case of a metal powder, it is mixed with the powder carrying polymer in the form of a paste, i.e., a thickened suspension in a solvent, to improve its disperseability in the polymer component (coated film forming element).

For example, in a case of the Al powder, the Al powder or Al vapor deposition film is pulverized in a ball mill charged with a solvent for preparation.

The PWC in the coated film ingredient should be 20% or less, preferably, 15% or less. There is no particular restriction on the lower limit but it is usually 5% or, preferably, 8%.

If the PWC is too low, the hiding effect for the background color can not be obtained easily. Furthermore, sufficient glittering appearance cannot be obtained. On the other hand, if the pigment content is excessively high, glittering appearance cannot be obtained and, in addition, the coated film depositability (adhesiveness) to the substrate deterioates.

The paint according to the present invention may be optionally blended with auxiliary materials, blended customarily to paints such as tackifiers (ketone resin and petroleum resin), waxes (polyethylene wax and polypropylene wax), plasticizers, dispersants and UV-ray absorbents.

The concentration of the non-volatile ingredient (solid content) in the prepared paint (NV) may vary, depending on the coatability and the thickness of the glittering layer, however each time the paint is prepared such that the NV content is usually from 4 to 20%, preferably, 10 to 15%.

If the solid concentration (NV) is too low, it becomes difficult to obtain a coating of desired thickness, and, on the other hand, if the solid concentration is excessively high, coated films of uniform thickness cannot be attained easily.

A method for forming the glittering coated film, using the paint described above will be explained below.

First, a glittering coated film (first layer) 16B is formed by using a glittering paint, according to this invention on a degreased substrate (plastics) 12. Then, a top coat layer (clear coated film) 18 is formed, although this is not essential.

Usually, the glittering coated film and the clear coated film may be dried at room temperature, but the coated films are preferably dried under heating. The heat is applied to increase productivity and to promote cross-linking of the polymer ingredient, when the heat-curable type polymeric materials are used. Further, if the adhesion between the substrate and the glittering paint is not satisfactory, a primer layer is formed, usually as a first layer to produce a three layered arrangement or structure as a whole.

The thickness of the glittering layer 16B, formed of the glittering paint is usually 5 to 20 $\mu$m and, preferably, 8 to 16 $\mu$m. If the thickness is excessively thin, it is difficult to mask the background color, thereby failing to obtain the glittering appearance. On the other hand, if the thickness is excessively thick, the glittering paint is wasted.

Further, as the clear paint for forming the top coat layer 18, the various materials can be used suitably, depending on the polymer ingredient forming the glittering paint. The thickness of the top coat layer 18 is 5 to 50 μm. The thickness of the top coat and the paint used for the top coat is determined to provide favorable glittering appearance. In order to achieve satisfactory glittering, the top coat layer 18 may have to have such a low thickness that it provides remarkably insufficient protection for the glittering layer in the glittering coatings of the prior art described in the patent publications.

For the clear paint, resin paints used conventionally as the top coating such as acryl urethane, polyurethane acryl silane and UV-curable type paints, can be used.

Further when the substrate comprises, for example, PP and the adhesion between the substrate and the glittering layer comprising the glittering paint is not satisfactory, a primer layer is formed optionally as a first layer to produce a three layered arrangement or structure as a whole.

The primer layer used in this case is not intended for leveling unevenness on the surface of the substrate as it customary used according to the descriptions disclosed in the patent publications. Therefore, the thickness of the primer layer may be extremely thin, for example 5 to 15 μm.

As the primer for forming the primer layer, polar group-introduced polyolefinic paints such as chlorinated polypropylene, hydroxyl group modified polypropylene and maleic acid modified materials can be used suitably.

The glittering paint for obtaining a glittering coated film, according to this invention, comprises a coated film forming polymer, a glittering pigment comprising inorganic powder and a solvent, wherein the coated film forming polymer comprises a pigment carrying polymer, wherein the pigment carrying polymer has a weight average molecular weight (Mw) of at least 50,000 and refractive index (by Abbe's refractometer) ($n_D$) of at least 1.48, the coated film forming polymer has an overall weight average molecular weight (Mw) of at least 50,000, the inorganic powder has an aspect ratio of at least 50 and, the PWC in the coated film is 15% or less.

The glittering paint of this invention can be applied as thick coating, not necessarily requiring formation of the primer layer or a clear top coat layer. Further, a glittering surface of metallic tone can be obtained for the coated film without using expensive vapor deposition film pulverization products for forming the metallic tone glittering surface.

EXAMPLE 1

This invention is further illustrated in Examples according to the invention in comparison to Comparative examples, conducted for comparing the advantages of the present invention.

Paint Preparation Examples and Comparative Examples

Glittering paints (paints of metallic tone) for illustrative Examples and Comparative Examples were prepared in accordance with compositional formulations shown in Tables 1 to 4. Required characteristic values in this invention are indicated in lower rows. Examples 8 to 13 and Comparative Examples 5 to 7 are two component paints in which the polymer ingredient comprises first and second polymers.

For the glittering paint, the following aluminum pastes were used.

Al paste 1: Al vapor deposition pulverized type,
   Al content: 10%, aspect ratio: 300
Al paste 2: Al flake pulverized type,
   Al content: 70%, aspect ratio: 60
Al paste 3: Al flake pulverized type,
   Al content: 70%, aspect ratio: 40

The amount of the aluminum paste in the following tables represents the amount of aluminum only.

TABLE 1

|  |  | Comp. Example 1 | Example 1 | Example 2 | Example 3 | (unit: parts by weight) Comp. Example 2 |
|---|---|---|---|---|---|---|
| Pigment carrying polymer | Nitrocellulose Mw: 40,000 | 4.0 | — | — | — | — |
|  | Nitrocellulose Mw: 220,000 | — | 4.0 | — | — | 4.0 |
|  | Nitrocellulose Mw: 440,000 | — | — | 4.0 | — | — |
|  | Nitrocellulose Mw: 640,000 | — | — | — | 4.0 | — |
|  | Acryl lacquer Mw: 50,000 | — | — | — | — | — |
|  | Chlorinated PP Mw: 50,000 | — | — | — | — | — |
| Glitterring pigment | Aluminum paste 1 | 0.6 | 0.6 | 0.6 | 0.6 | 1.1 |
|  | Aluminum paste 2 | — | — | — | — | — |
|  | Aluminum paste 3 | — | — | — | — | — |
| Solvent | Toluene | 15.4 | 15.4 | 15.4 | 15.4 | 15.3 |
|  | Methyl isobutyl ketone | 50.0 | 50.0 | 50.0 | 50.0 | 49.8 |
|  | n-butyl acetate | — | — | — | — | — |
|  | Isobutyl acetate | 30.0 | 30.0 | 30.0 | 30.0 | 29.8 |
| Total |  | 100.0 | 100.0 | 100.0 | 100.0 | 100.0 |
| PWC |  | 13% | 13% | 13% | 13% | 22% |
| Polymer molecular weight (Mw) |  | 40,000 | 220,000 | 440,000 | 640,000 | 220,000 |
| Polymer refractive index |  | 1.50 | 1.50 | 1.50 | 1.50 | 1.50 |
| Al powder aspect ratio |  | 300 | 300 | 300 | 300 | 300 |

TABLE 2

(unit: parts by weight)

| | | Example 4 | Comp. Example 3 | Comp. Example 4 | Example 5 | Example 6 | Example 7 |
|---|---|---|---|---|---|---|---|
| Pigment carrying polymer | Nitrocellulose Mw: 40,000 | — | — | — | — | — | — |
| | Nitrocellulose Mw: 220,000 | 4.0 | 4.0 | — | — | — | — |
| | Nitrocellulose Mw: 440,000 | — | — | — | — | — | — |
| | Nitrocellulose Mw: 640,000 | — | — | — | — | — | — |
| | Acryl lacquer Mw: 50,000 | — | — | 4.0 | — | — | — |
| | Chlorinated PP Mw: 50,000 | — | — | — | 4.0 | 4.0 | — |
| | Vinyl chloride/ vinyl acetate copolymer Mw: 50,000 | — | — | — | — | — | 4.0 |
| Glittering Pigment | Aluminum paste 1 | — | — | 0.6 | 0.6 | — | 0.6 |
| | Aluminum paste 2 | 0.6 | — | — | — | 0.6 | — |
| | Aluminum paste 3 | — | 0.6 | — | — | — | — |
| Solvent | Toluene | 15.4 | 15.4 | 15.4 | 70.0 | 70.0 | 70.0 |
| | Methyl isobutyl ketone | 50.0 | 50.0 | 50.0 | 25.4 | 25.4 | 25.4 |
| | n-butyl acetate | — | — | — | — | — | — |
| | Isobutyl acetate | 30.0 | 30.0 | 30.0 | — | — | — |
| Total | | 100.0 | 100.0 | 100.0 | 100.0 | 100.0 | 100.0 |
| PWC | | 13% | 13% | 13% | 13% | 13% | 13% |
| Polymer molecular weight (Mw) | | 220,000 | 220,000 | 50,000 | 50,000 | 50,000 | 50,000 |
| Polymer refractive index | | 1.50 | 1.50 | >1.48 | 1.48 | 1.48 | 1.48 |
| Al powder aspect ratio | | 60 | 40 | 300 | 300 | 60 | 300 |

TABLE 3

(unit: parts by weight)

| | | Example 8 | Example 9 | Example 10 | Comp. Example 5 | Example 11 |
|---|---|---|---|---|---|---|
| Pigment carrying polymer (first polymer) | Nitrocellulose Mw: 40,000 | — | — | — | — | — |
| | Nitrocellulose Mw: 220,000 | 7.0 | 5.0 | 4.0 | 2.0 | — |
| | Nitrocellulose Mw: 640,000 | — | — | — | — | 4.0 |
| (second polymer) | Acryl polyol Mw: 20,000 | 3.0 | 5.0 | 6.0 | 8.0 | 6.0 |
| | Isocyanate prepolymer: curing agent | 1.5 | 2.5 | 3.0 | 4.0 | 3.0 |
| Glittering pigment | Aluminum paste 1 | 1.7 | 1.8 | 1.9 | 2.1 | 1.9 |
| | Aluminum paste 2 | — | — | — | — | — |
| Solvent | Toluene | 26.0 | 25.5 | 25.4 | 25.1 | 25.4 |
| | Methyl isobutyl ketone | 34.8 | 34.7 | 34.3 | 33.7 | 34.3 |
| | Isobutyl acetate | 26.0 | 25.5 | 25.4 | 25.1 | 25.4 |
| Total | | 100.0 | 100.0 | 100.0 | 100.0 | 100.0 |
| PWC | | 13% | 13% | 13% | 13% | 13% |
| Polymer molecular weight (Mw) | | 140,000 | 100,000 | 80,000 | 40,000 | 210,000 |
| Polymer refractive index | | 1.50 | 1.50 | 1.50 | 1.50 | 1.50 |
| Al powder aspect ratio | | 300 | 300 | 300 | 300 | 300 |

TABLE 4

(unit: parts by weight)

| | | Example 12 | Comp. Example 6 | Example 13 | Comp. Example 7 |
|---|---|---|---|---|---|
| Pigment carrying polymer (first | Nitrocellulose Mw: 40,000 | — | — | — | 4.0 |
| | Nitrocellulose Mw: 220,000 | 4.0 | 2.0 | — | — |

TABLE 4-continued (unit: parts by weight)

|  |  | Example 12 | Comp. Example 6 | Example 13 | Comp. Example 7 |
|---|---|---|---|---|---|
| polymer) | Nitrocellulose Mw: 640,000 | — | — | 4.0 | — |
| (second polymer) | Acryl polyol Mw: 20,000 | 6.0 | 8.0 | 6.0 | 6.0 |
|  | Isocyanate prepolymer: curing agent | 3.5 | 4.0 | 3.0 | 3.0 |
| Glittering pigment | Aluminum paste 1 | — | — | — | — |
|  | Aluminum paste 2 | 1.9 | 2.1 | 1.9 | 1.9 |
| Solvent | Toluene | 25.4 | 25.1 | 25.4 | 25.4 |
|  | Methyl isobutyl ketone | 34.3 | 33.7 | 34.3 | 34.3 |
|  | Isobutyl acetate | 25.4 | 25.1 | 25.4 | 25.4 |
| Total |  | 100.0 | 100.0 | 100.0 | 100.0 |
| PWC |  | 13% | 13% | 13% | 13% |
| Polymer molecular weight (Mw) |  | 80,000 | 40,000 | 210,000 | 30,000 |
| Polymer refractive index |  | 1.50 | 1.50 | 1.50 | 1.50 |
| Al powder aspect ratio |  | 60 | 60 | 60 | 60 |

EXAMPLE 2

Coated Film Preparation Examples and Comparative Examples

On the surface of a degreased ABS or PP substrate, paints for respective examples and comparative examples in Tables 5, 6 and 7 were formed as the first layer (glittering layer: dry film thickness of about 10 μm), through steps of spray coating and drying (80° C.×30 min). The top coat layer (dry thickness of about 30 μm) was then formed, using acryl urethane type clear paint, through steps of the spray coating and drying (80° C.×30 min), in the same manner as for the first coat, to prepare glittering coated films having a two layer structure.

Hot blow drying furnace was used for the above described drying steps.

TABLE 5

|  | Coated film Comp. Example 1 | Coated film Example 1 | Coated film Example 2 | Coated film Example 3 | Coated film Comp. Example 2 |
|---|---|---|---|---|---|
| Substrate | ABS | ← | ← | ← | ← |
| Glittering layer | Comp. Example 1 | Example 1 | Example 2 | Example 3 | Comp. Example 2 |
| Top coat layer | Acryl urethane clear | ← | ← | ← | ← |
| Depositability | 0/100 | 0/100 | 0/100 | 0/100 | 100/100 |
| Functional evaluation for glittering | 2 | 4 | 5 | 5 | 4 |

TABLE 6

|  | Coated film Example 4 | Coated film Com. Example 3 | Coated film Comp. Example 4 | Coated film Example 5 | Coated film Example 6 | Coated film Example 7 |
|---|---|---|---|---|---|---|
| Substrate | ABS | ← | ← | PP | ← | ← |
| Glittering layer | Example 4 | Comp. Example 3 | Comp. Example 4 | Example 5 | Example 6 | Example 7 |
| Top coat layer | Acryl urethane clear | ← | ← | ← | ← | ← |
| Depositability | 0/100 | 0/100 | 0/100 | 0/100 | 0/100 | 0/100 |
| Functional evaluation for glittering | 4 | 3 | 2 | 5 | 4 | 4 |

TABLE 7

|  | Coated film Example 8 | Coated film Example 9 | Coated film Example 10 | Coated film Comp. Example 5 | Coated film Example 11 | Coatd film Example 12 | Coated film Comp. Example 6 | Coated film Example 13 | Coating film comp. Example 7 |
|---|---|---|---|---|---|---|---|---|---|
| Substrate | ABS | ← | ← | ← | ← | ABS | ← | ← | ← |
| Glittering layer | Example 8 | Example 9 | Example 10 | Comp. Example 5 | Example 11 | Example 12 | Comp. Example 6 | Example 13 | Comp. Example 7 |
| Top coat layer | Acryl urethane | ← | ← | ← | ← | Acryl urethane | ← | ← | ← |
| Depositability | 0/100 | 0/100 | 0/100 | 0/100 | 0/100 | 0/100 | 0/100 | 0/100 | 0/100 |
| Functional evaluation for glittering | 5 | 4 | 4 | 2 | 5 | 4 | 2 | 4 | 1 |

EXAMPLE 3

Test for Coated Film Characteristics

A test was conducted for each of the following characteristics, on each of the prepared coated films.

(1) Test for Adhesiveness:

Adhesiveness was tested in accordance with JIS K 5400 (score (cross-cut) tape method).

(2) Functional Test for Glittering Appearance

The glittering appearance was evaluated visually, in accordance with the criteria shown in Table 8 under usual office white illumination (luminosity: about 700 lux).

TABLE 8

| Evaluation rank | Judging criteria |
|---|---|
| 1 | Particle: coarse with no metallic appearance |
| 2 | Particle: fine but with less metallic appearance |
| 3 | Particle: very fine with somewhat metallic appearance |
| 4 | Particle: scarcely observed, with considerable metallic appearance |
| 5 | Metallic appearance similar to chromium plated surface |

Test results for each of coated films in Examples and Comparative examples are shown in Tables 5, 6, 7 respectively. It can be seen that the coated films in the illustrative Examples for forming the glittering coated films, by using the glittering paints which satisfy the requirements of this invention satisfy, both the functional test for the glittering film as well as the test for the adhesiveness.

As can be seen from Examples 1 to 3, in one component type paints, the glittering appearance of the coated film increases substantially in proportion with the increase in the molecular weight (Mw) for the same kind of resins (nitro cellulose).

Furthermore, as it can be seen from Example 8, two component type film forming polymer having the overall polymer molecular weight (Mw) of at least 120,000 exhibits excellent glittering appearance superior to the appearance exhibited by Examples 9 and 10 with the molecular weight of less than 120,000. It also can be seen from Comparative Examples 1, 5, 6 and 7 with the polymer molecular weight (Mw) of less than 50,000 that satisfactory glittering appearance can not be obtained for the coated film even when the refractive index ($n_D$) of the pigment carrying polymer is 1.48 or more.

It can be seen that satisfactory glittering appearance cannot be obtained for the coated film in Comparative Example 3, wherein the aspect ratio of the glittering pigment of 50 or less, the molecular weight (Mw) is 50,000 or more and the refractive index ($n_D$) is 1.48 or more.

Furthermore, it can be seen that satisfactory glittering appearance cannot be obtained for a coated film in Comparative Example 4, wherein the refractive index ($n_D$) of the glittering pigment (inorganic powder) carrying polymer is less than 1.48, the molecular weight (Mw) of the polymer ingredient is 50,000 or more and the aspect ratio is 300 or more.

What is claimed is:

1. A glittering paint for obtaining a glittering coated film, comprising:
    a coated film forming polymer; and
    a glittering pigment comprising an inorganic powder and a solvent,
    wherein the coated film forming polymer comprises a pigment carrying polymer (first polymer) and a second polymer,
    the pigment carrying polymer has a weight average molecular weight Mw of at least 50,000 and a refractive index $n_D$ of at least 1.48 as measured by an Abbe refractometer,
    the second polymer has a weight average molecular weight Mw of less than 50,000,
    the coated film forming polymer has a weight average molecular weight Mw of at least 50,000,
    the inorganic powder has an aspect ratio of particle length or diameter to particle thickness of at least 50, and
    the glittering pigment weight concentration PWC in the coated film is 15% or less.

2. A glittering paint as defined in claim 1, wherein a mixing ratio between the pigment carrying polymer and the second polymer mixed with the pigment carrying polymer is at least 4/6 by weight of the pigment carrying polymer to the second polymer.

3. A glittering paint as defined in claim 1, wherein a mixing ratio between the pigment carrying polymer and the second polymer mixed with the pigment carrying polymer is at least 5/5 by weight of the pigment carrying polymer to the second polymer.

4. A glittering paint as defined in claim 1, wherein the inorganic powder has an aspect ratio of 250 to 500.

5. A glittering paint as defined in claim 4, wherein the inorganic powder comprises a vapor deposited aluminum film pulverization product, aluminum foil pulverization product or mixtures thereof.

6. A glittering paint as defined in claim 1, wherein the pigment carrying polymer comprises at least one cellulose polymer.

7. A glittering paint as defined in claim 1, wherein the pigment carrying polymer comprises at least one polar group-containing vinyl polymer.

8. A glittering paint as defined in claim 7, wherein the polar group-containing vinyl polymer comprises at least one polar group-introduced polyolefins.

9. A glittering coated film comprising at least one layer having a glittering surface formed on a substrate, wherein
the at least one layer is formed to a thickness of 5 to 20 μm by using the glittering paint as defined in claim 1.

10. A glittering coated film as defined in claim 9, wherein a top coat layer is formed on the at least one layer.

11. A glittering coated film as defined in claim 10, wherein the at least one layer is formed directly on the substrate.

12. A glittering paint as defined in claim 6, wherein the cellulose polymer is selected from the group consisting of cellulose esters, cellulose ethers and combinations thereof.

13. A glittering paint as defined in claim 6, wherein the cellulose polymer is cellulose nitrate.

14. A glittering paint as defined in claim 7, wherein the polar group-containing vinyl polymer is selected from the group consisting of vinyl chloride, vinyl acetate copolymer, polyvinyl butyral and combinations thereof.

15. A glittering paint as defined in claim 8, wherein the polar group-introduced polyolefin in selected from the group consisting of chlorinated polypropylene (PP), hydroxyl group modified PP, maleic acid modified PP, hydroxy group modified polyethylene (PE), maleic acid modified PE and combination thereof.

16. A glittering paint as defined in claim 1, wherein the refractive index is at least 1.50.

17. A glittering paint as defined in claim 1, wherein the pigment carrying polymer has a molecular weight Mw of at least 80,000.

18. A glittering paint as defined in claim 1, wherein the pigment carrying polymer has a molecular weight Mw of at least 120,000.

19. A glittering paint for obtaining a glittering coated film, comprising:
a coated film forming polymer; and
a glittering pigment comprising an inorganic powder and a solvent,
wherein the coated film forming polymer consists all or partially of a pigment carrying polymer,
the pigment carrying polymer has a weight average molecular weight Mw of at least 200,000 and a refractive index $n_D$ of at least 1.48 as measured by an Abbe refractometer,
the coated film forming polymer has a weight average molecular weight Mw of at least 50,000,
the inorganic powder has a ratio of particle length or diameter to particle thickness of at least 50, and
the glittering pigment weight concentration PWC in the coated film is 15% or less.

* * * * *